Figure 1:
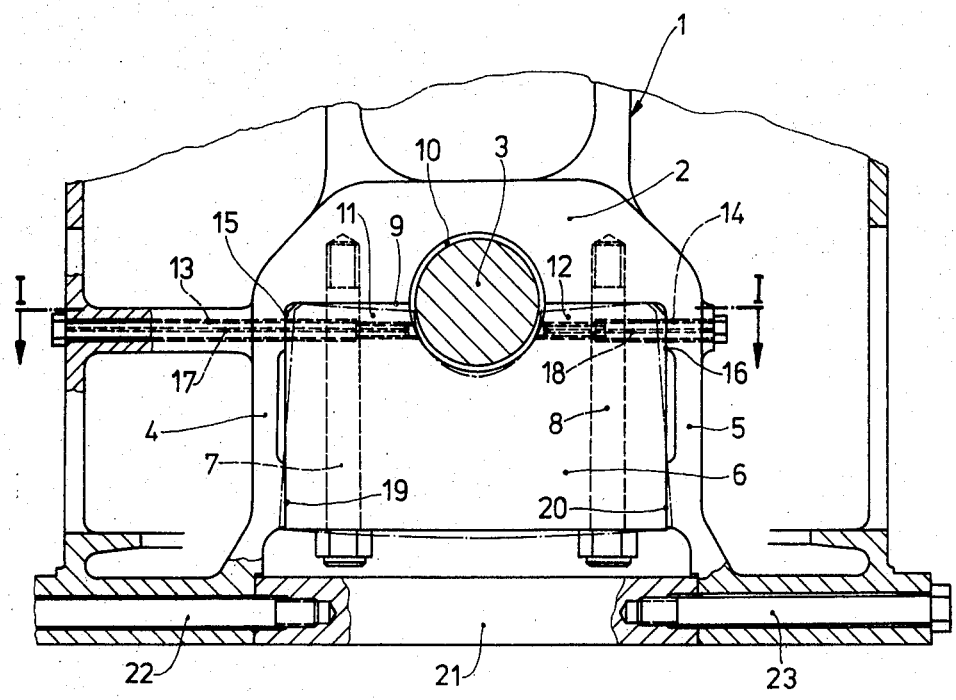

United States Patent [19]
Pfleiderer

[11] 3,782,792
[45] Jan. 1, 1974

[54] CYLINDER-PISTON INTERNAL COMBUSTION ENGINE AND BEARING CONSTRUCTION THEREFOR

[75] Inventor: Ernst Pfleiderer, Konigsbrunn, Germany

[73] Assignee: Maschinenfabrik Augsburg-Nurnberg A.G. (M.A.N.), Augsburg, Germany

[22] Filed: June 15, 1972

[21] Appl. No.: 263,018

[30] Foreign Application Priority Data
July 22, 1971 Germany............... P 21 36 631.4

[52] U.S. Cl............................... 308/23, 123/195 H
[51] Int. Cl. ............................................. F16c 9/02
[58] Field of Search............................ 308/23, 74; 123/195 H

[56] References Cited
UNITED STATES PATENTS
2,752,896 7/1956 Emele................................. 308/23
3,117,498 1/1964 Johnson et al....................... 308/23

*Primary Examiner*—Al Lawrence Smith
*Assistant Examiner*—Frank Susko
*Attorney*—Flynn & Frishauf

[57] ABSTRACT

To provide a hanging, separable bearing on a vertically installed internal combustion engine, a bearing cover is secured from the bottom to the machine part, and carrying a half-cylindrical bearing portion. To prevent distortion of the bearing lining upon longitudinally twisting loading, transverse screws clamp the lower bearing half shell to the machine frame, located close to the separating gap between the lower bearing half shell and the machine portion, to additionally clamp the lower half bearing shell to the machine.

9 Claims, 2 Drawing Figures

PATENTED JAN 1 1974 3,782,792

CYLINDER-PISTON INTERNAL COMBUSTION ENGINE AND BEARING CONSTRUCTION THEREFOR

The present invention relates to internal combustion engines and more particularly to upright cylinder-piston-type internal combustion engines and to the bearing arrangements therefor, in which the main crankshaft bearings are hung from the structure of the engine, to be located below the engine cylinders.

Large internal combustion engines, and particularly multiple cylinder internal combustion engines have been proposed in which the bearings for the crankshaft are secured to the engine housing from below (see German Pat. No. 1,268,901). In this arrangement, half-bearings, with bearing liners, are formed on a bearing housing which is separable from the machine housing, and screwed thereto tightly by bolts, the surfaces on the bearing housing and the machine housing being matched, so that when the bolts are tightened, the surfaces will be in frictional engagement with each other. The force with which the half bearing housing, that is, the bearing shell, is tightened against the machine is substantial, in order to increase the frictional forces holding the bearings together against distortion or twisting to which the bearing is subjected when the various pistons of a multiple piston engine are subjected to the power stroke. It is necessary to tighten the bearing shell against the machine housing with a high force; high loading, however, has shown that even substantial compression forces of the bearing shell against the machine housing are not sufficient to prevent relative movement of the bearing shell and the machine housing, and resulting wear and tear on the matching surfaces, the bearing liners themselves, and the crankshaft being retained within the bearing.

It is believed that the reason for the wear and tear to which hanging bearings on multi-cylinder internal combustion engines are subjected is due to the force acting on the piston during the power stroke. The dynamic unbalances resulting from the rotation of the crankshaft itself can be compensated by rotary masses, so that dynamic balance of the crankshaft unit as a whole can be obtained. Yet, the pressure due to ignition during the power stroke provides substantial pressure against the crankshaft, and particularly against the bearing liner which is below the cylinders, so that yielding of a portion of the bearing shell is hardly avoided, resulting in a movement which is in axial direction, back and forth. The side portions of the bearing shell which should be frictionally engaged by the machine housing thus are subject to movement. The interrelation of the forces on the crankshaft, during the power stroke, and the result of these forces on the crankshaft, particularly in high power internal combustion engines, have not been considered in the past.

It is an object of the present invention to provide a bearing construction, particularly for multi-cylinder, high-power internal combustion engines, in which the bearings are so constructed that deformation of the lower, hanging bearing shell is effectively suppressed, even during the high forces arising during the power stroke of the engine.

Subject matter of the present invention

Briefly, the bearing cover or shell is secured, in conventional manner, from below to the machine housing. Additionally to this conventional form of attachment, however, are at least two, and preferably four clamp screws which extend perpendicularly to the axis of the crankshaft and also perpendicularly to the axes of the screws retaining the bearing shell to the housing, in other words, sideways from both sides of the engine frame into the bearing shell, to clamp the bearing shell securely in position, and to take up any resulting tension forces which arise and which would tend to move the bearing shell downwardly and break the frictional engagement of the matching surfaces of the bearing shell and the engine housing. Preferably, two clamp screws are inserted from each side, straddling the main support screws of the bearing shell, extending vertically upwardly; in accordance with an embodiment of the invention, the housing is extended downwardly on both sides of the bearing shell and further matching surfaces are located at the bottom end of the projection, which are clamped together for example by means of screws and a spacer, so that the bearing housing or bearing cover is securely maintained in position within the housing of the engine.

Figure 2:
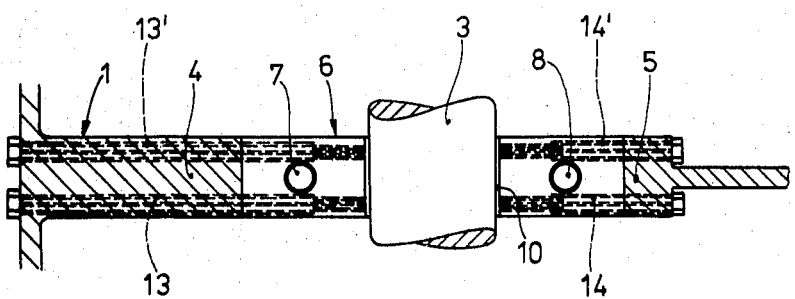

The invention will be described by way of example with reference to the accompanying drawings, wherein:

FIG. 1 is a longitudinal sectional view illustrating a crankshaft bearing, the section being taken perpendicular to the axis of the crankshaft; and FIG. 2 is a transverse sectional view along lines I—I of FIG. 1.

The internal combustion engine is not shown in greater detail, and may be any well known internal combustion engine, for example a large Diesel engine of the stationary type. The machine structure, generally shown at 1 and having a cylinder in its upward region (not shown) is formed with a bearing cover 2 which is upwardly concave and located in the lower portion of the machine structure. Crankshaft 3 is located in the half shell of the bearing 2. Free side portions 4, 5 of the machine structure surround a separate, and removable bearing cover or shell 6 which is secured to the engine structure by bearing screws 7, 8, so that the bearing shell 6 will be tightened to the housing. The two halves of the bearing 2 and 6 fit together at a junction line or surface 9, which extends perpendicularly to the extent of the screws 7, 8. A bearing liner 10 is located within the half bearing housings or shells 2, 6 to retain the bearing portion of the crankshaft 3 in position.

The screws 7, 8 are tightened with substantial force so that the portions of the bearing 2, 6 are frictionally engaged at the matching surface 9 to be able to accept forces due to the rotation of the crankshaft 3 without relative motion of the parts along the surface 9.

Upon loading of the crankshaft 3 by the pressure upon the power stroke of the engine, the lower bearing shell 6 is stressed in the region immediately beneath the crankshaft 3. It is deformed in the manner shown — exaggerated — in the chain-dotted lines (FIG. 1). The force due to the bearing screws 7 and 8 will not be sufficient to prevent some relative motion of the two bearing parts 2 and 6 along the surface 9. As a result, the bearing surface will no longer be as originally designed but will deform or score, and eventually result in a relationship of the bearing parts for the crankshaft 3 which is undesired and causes deformation and additional friction in the bearing.

In accordance with the present invention, undesirable deformation of the side portions 11 and 12 of the lower bearing shell can be avoided by providing additional clamping screws 13, 14, extending laterally from the sides of the engine. They are placed in the immediate vicinity of the separating surface 9 and clamp the side portions 11 and 12 of the lower bearing shell 6 to the side portions 4 and 5 of the engine structure 1. The points of engagement of the lateral clamping screws 13, 14, in accordance with a preferred form of the invention, are placed in the immediate vicinity of the crankshaft 3, or rather, the bearing shell 10 therefor. Thus, the zone at which force is applied is as close to the bearing liner 10 as possible. The force with which the clamping screws 13, 14 can be tightened can be increased if the lower shell 6 is formed with lateral matching surfaces 15, 16 which engage the engine structure 1. Undesired cross loading by possibly arising transverse forces on the clamping screws 13,14 is preferably avoided by forming the clamping screws 13, 14 with a central bore 17, 18, respectively.

The deformation of the bearing portion 6, shown in chain-dotted line, upon loading by ignition pressures during the power stroke would, in the absence of the present invention, cause outward bulging of the lower region of the bearing shell 6. This deformation can be impeded by forming further matching surfaces 19, 20 at the lower portions of the bearing shell 6 as well as on the engine structure and then fitting the shell between these matching surfaces. The engine structure 1, and particularly the depending extending side portions 4, 5 are clamped together in order to prevent an outward force being applied by the shell 6 which tends to deform the surfaces 19, 20. A spacer element 21 and a pair of clamp bolts 22, 23 clamp the surfaces 19, 20 securely in position, in order to prevent relative movement of the bearing shell 6 with respect to the engine structure 1 along the matching surfaces 19, 20 and additionally to inhibit possible lateral excursions of the lower portions of the bearing shell 6, as illustrated in greatly exaggerated form in the chain-dotted lines of FIG. 1. Providing lateral clamping screws 22, 23 which engage a spacer 21 additionally increases the stiffness of the entire structure. Preferably, the spacer 21 is made to be just slightly smaller than the normal distance between the side portions 4, 5 of the engine structure 1, so that it can readily be inserted. Thereafter, the tension bolts 22, 23 are tightened, which will slightly deform the lower portions 4, 5, in a direction counter the deformation due to loading of the bearing shell 6 upon occurrence of a power stroke in the internal combustion engine. Substantial forces can thus be transmitted from the screws 22, 23 and the spacer 21 to securely clamp the bearing shell 6 between the surfaces 19, 20.

A very slight clearance or play between the surfaces 19, 20 facilitates assembly of the bearing; similarly, the surfaces 15, 16 can be formed to have a very slight play, the clamping force of the screws 13, 14 and 22, 23 clamping the parts securely together.

In accordance with a modification of the present invention, the spacer 21 can be omitted and, instead, bolts 22, 23 can be secured from the side of the engine housing into the lower portions of the bearing shell 6 in the region of the surfaces 19, 20, the screws engaging in a manner similar to screws 13, 14 as shown.

Symmetry of clamping forces is readily obtained if the side portions 11, 12 of the lower bearing shell are clamped by a pair of clamping screws 13, 13' and 14, 14', the individual screws of each pair straddling the main bearing screws 7, 8. Utilizing four clamping screws 13, 13' and 14, 14' (FIG. 2) additionally secures the bearing portions 11, 12 of the lower shell 6 in position and permits use of main bearing screws 7, 8 of lower strength, and thus of smaller size so that, for any one bearing, only two screws 7, 8 are usually sufficient.

Locating the lateral clamping screws 13, 13', 14, 14' in the immediate vicinity of the crankshaft or, rather, of the bearing liner therefor, places the major portion of the material of the lower bearing shell adjacent the separating surface between the force points of the clamping screws in the shell and their counter surface on the engine structure. This location increases the effect of the clamping screws and permits high loading. The compressive forces arising from the tightening of the main bearing screws 7, 8 are better transferred and controlled by additionally providing the clamping forces due to lateral screws 13, 14 (and, if desired, 13', 14'). The lower bearing shell can be accurately made, already with a semi-circular bearing section for the crankshaft, without slight elliptic deformation which is later to be compensated by compressive forces; the lateral screws permit transfer of high initial pre-stressing forces from the lower bearing shell into the lateral portions of the engine structure, to increase the resistance against deformation during operation.

Various changes and modifications may be made within the inventive concept.

What is claimed is:

1. Cylinder-piston internal combustion engine
having a housing (1, 2);
a crankshaft (3);
bearings (10) for said crankshaft, said bearings being separable, and one half cylindrical portion of the bearing being formed in the housing;
a bearing cover (6) forming the other half of the cylindrical portion of the bearing;
screw means (7, 8) extending in a plane perpendicular to the axis of the crankshaft and securing the bearing cover to the housing;
the housing (2) and the bearing cover (6) having mating surfaces (9) which are frictionally engaged upon tightening of said screw means;
and at least two clamping screws (13, 13'; 14, 14') extending perpendicularly to the axis of the crankshaft (3) and perpendicularly to the axis of the screw means (7, 8) one each clamp screw engaging both said bearing cover (6) and the engine housing (1) from a respective side of the crankshaft said clamp screws (13, 13'; 14, 14') being located in the region of the bearing cover (6) which is adjacent the half-cylindrical bearing portion and adjacent the bearing cover junction surface (9) to provide clamping forces between the engine housing (1) and the bearing cover (6) in a region where the bearing cover (6) is subjected to compression forces.

2. Engine according to claim 1, wherein the housing has side fitting surfaces (15, 16) extending in planes substantially parallel to the axis of the crankshaft (3); and the clamping screws (13, 13'; 14, 14') are located in a region of said side fitting surfaces.

3. Engine according to claim 1, wherein the clamping screws are formed to be elastic with respect to transverse forces.

4. Engine according to claim 3, wherein the clamping screws (13, 13'; 14, 14') are formed with a central bore (17, 18) to be elastic with respect to transverse forces.

5. Engine according to claim 1, wherein the housing (1) extends beyond the crankshaft (3) and is formed with lower side fitting surfaces (19, 20);

and said bearing cover (3) is formed with matching surfaces.

6. Engine according to claim 5, comprising extension portions extending the housing, said extension portions carrying said side surfaces (19, 20);

and means (21, 22, 23) to tighten said lower side surfaces together and clamp the lower matching sides of the bearing cover therebetween.

7. Engine according to claim 6, wherein the clamping means comprises a spacer block (21) just slightly shorter than the clear distance between the extension portions (4, 5);

and bolts (22, 23) tightening said spacer block between the extending portions.

8. Engine according to claim 5, comprising means (21, 22, 23) located in the region of the lower side fitting surfaces (19, 20) extending perpendicularly to said side surfaces and tightening said surfaces to the matching surfaces on the bearing cover (6).

9. Engine according to claim 1, whrein a pair of clamp screws (13, 13'; 14, 14') extend from each side of the housing, one each clamp screw of each pair straddling said screw means (7, 8) connecting the bearing cover to the housing.

* * * * *